United States Patent
Gao et al.

(10) Patent No.: US 10,971,764 B2
(45) Date of Patent: Apr. 6, 2021

(54) CHARGING METHOD, CHARGING DEVICE, AND CHARGING SYSTEM

(71) Applicant: Positec Power Tools (Suzhou) Co., Ltd., Suzhou (CN)

(72) Inventors: Don Zhendong Gao, Suzhou (CN); Guoliang Mu, Suzhou (CN); Mingming Chen, Suzhou (CN); Dongjing Song, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 95 days.

(21) Appl. No.: 16/354,997

(22) Filed: Mar. 15, 2019

(65) Prior Publication Data

US 2019/0288534 A1    Sep. 19, 2019

Related U.S. Application Data

(63) Continuation of application No. PCT/CN2017/101070, filed on Sep. 8, 2017.

(30) Foreign Application Priority Data

Sep. 18, 2016  (CN) .......................... 201610828144.5

(51) Int. Cl.
*H01M 10/42* (2006.01)
*H02J 7/00* (2006.01)

(52) U.S. Cl.
CPC ............. *H01M 10/425* (2013.01); *H02J 7/00* (2013.01); *H02J 2207/20* (2020.01)

(58) Field of Classification Search
CPC ........................... H01M 10/425; H02J 7/0042
(Continued)

(56) References Cited

U.S. PATENT DOCUMENTS

2001/0020838 A1* 9/2001 Malackowski ....... H02J 7/0022
                                                          320/116
2003/0044689 A1* 3/2003 Miyazaki ............ H01M 10/425
                                                          429/320

(Continued)

FOREIGN PATENT DOCUMENTS

CN          103187744 A       7/2013
CN          104850206 A       8/2015
(Continued)

OTHER PUBLICATIONS

State Intellectual Property Office of the P.R. China, International Search Report and Written Opinion for PCT/CN2017/101070 dated Nov. 3, 2017.

*Primary Examiner* — Jerry D Robbins
(74) *Attorney, Agent, or Firm* — Middleton Reutlinger

(57) ABSTRACT

The present invention relates to a charging apparatus, which comprises: a first charging interface and a second charging interface, which respectively and detachably connected to a first energy storage apparatus and a second energy storage apparatus; a power supply conversion circuit, converting external power supply into charging energy; a charging circuit, outputting charging energy output by the power supply conversion circuit to the first charging interface and the second charging interface, wherein the charging circuit comprises a first charging mode and a second charging mode. In the first charging mode, the charging circuit outputs charging energy to both the first charging interface and the second charging interface, and in the second charging mode, the charging circuit selectively outputs charging energy to the first charging interface or the second charging interface. The charging apparatus provided by the present invention possesses pluralities of choices of charging modes, and thus satisfies different charging requirements.

12 Claims, 12 Drawing Sheets

(58) Field of Classification Search
USPC .......................................................... 320/107
See application file for complete search history.

(56) References Cited

U.S. PATENT DOCUMENTS

| | | | | |
|---|---|---|---|---|
| 2003/0090234 | A1* | 5/2003 | Glasgow | H02J 7/0045 |
| | | | | 320/107 |
| 2005/0024021 | A1* | 2/2005 | Zeiler | H02J 7/0027 |
| | | | | 320/134 |
| 2007/0182365 | A1* | 8/2007 | Yang | H02J 7/0013 |
| | | | | 320/107 |
| 2011/0121783 | A1* | 5/2011 | Boyles | H02J 7/0042 |
| | | | | 320/113 |
| 2015/0008879 | A1* | 1/2015 | Schneider | B60L 53/80 |
| | | | | 320/110 |
| 2015/0244194 | A1* | 8/2015 | Tabuchi | H02J 7/0042 |
| | | | | 320/107 |
| 2015/0244197 | A1* | 8/2015 | Taga | H02J 7/0068 |
| | | | | 320/113 |
| 2015/0357684 | A1* | 12/2015 | Wingert | H01M 10/4257 |
| | | | | 320/112 |
| 2016/0099581 | A1* | 4/2016 | Kawamura | H02J 7/00 |
| | | | | 320/107 |
| 2016/0156202 | A1 | 6/2016 | Kim | |
| 2017/0063114 | A1* | 3/2017 | Briere | B65D 43/22 |

FOREIGN PATENT DOCUMENTS

| | | |
|---|---|---|
| CN | 104882941 A | 9/2015 |
| CN | 104953685 A | 9/2015 |

\* cited by examiner

CHARGING METHOD, CHARGING DEVICE, AND CHARGING SYSTEM

BACKGROUND

Technical Field

The present embodiments relate to a charging method. The present embodiments further relate to a charging apparatus that performs the charging method. The present embodiments further relates to a charging system including the charging apparatus.

Related Art

It is well known that a charging apparatus can charge an energy storage apparatus. One conventional charging apparatus has only one charging interface and can only charge one energy storage apparatus. The following improvements have been made to a charging apparatus in the prior art to enable one charging apparatus to charge a plurality of energy storage apparatuses simultaneously. A plurality of charging interfaces is disposed on the charging apparatus. The plurality of charging interfaces may be simultaneously and separately connected to a plurality of energy storage apparatuses, so that the charging apparatus can charge the energy storage apparatuses simultaneously.

In the prior art, a charging apparatus having a plurality of charging interfaces can charge energy storage apparatuses according to only one preset charging mode until the energy storage apparatuses are fully charged, but cannot provide different charging modes according to different states of the energy storage apparatuses or special requirements of an operator, and thus cannot satisfy varied requirements.

SUMMARY

To resolve the foregoing technical problem, the present embodiments provide a charging apparatus. Specific technical solutions are as follows: A charging apparatus, wherein the charging apparatus comprises: a first charging interface, detachably connected to a first energy storage apparatus; a second charging interface, detachably connected to a second energy storage apparatus, wherein at the same time when the first energy storage apparatus is connected to the first charging interface, the second charging interface may be connected to the second energy storage apparatus; a power supply conversion circuit, converting external power supply into charging energy; a charging circuit, outputting charging energy output by the power supply conversion circuit to the first charging interface and the second charging interface, wherein the charging circuit comprises a first charging mode and a second charging mode, in the first charging mode, the charging circuit outputs charging energy to both the first charging interface and the second charging interface, and in the second charging mode, the charging circuit selectively outputs charging energy to the first charging interface or the second charging interface; and a control circuit, selectively sending a first signal or a second signal to the charging circuit, wherein when the control circuit sends the first signal, the charging circuit is in the first charging mode; and when the control circuit sends the second signal, the charging circuit is in the second charging mode.

Alternatively, the charging apparatus further comprises an adjustable setting apparatus operated by a user, the adjustable setting apparatus is operable to send different signals to the control circuit, and the control circuit sends the first signal or the second signal to the charging circuit according to a signal sent by the adjustable setting apparatus.

Alternatively, the control circuit detects a first characteristic parameter of an energy storage apparatus connected to a charging interface, the control circuit sends the first signal or the second signal to the charging circuit according to the detection result, and the charging circuit enters the first charging mode or the second charging mode according to a signal sent by the control circuit, and charges the energy storage apparatus connected to the charging interface in a chosen charging mode until the energy storage apparatus is fully charged.

Alternatively, the control circuit further comprises a priority setting module, in the second charging mode, the charging circuit sequentially outputs charging energy to the first charging interface and the second charging interface, and the charging circuit sets, according to a signal sent by the priority setting module, an order of outputting charging energy to the first charging interface and the second charging interface.

Alternatively, the priority setting module detects a second characteristic parameter of an energy storage apparatus connected to a charging interface, determines, according to the second characteristic parameter, a time required to fully charge the energy storage apparatus, and sends a signal to the charging circuit according to the determining result.

Alternatively, the charging circuit first outputs, according to the signal sent by the priority setting module, charging energy to a charging interface connected to an energy storage apparatus that requires a short time to be fully charged, and then outputs, after the energy storage apparatus is fully charged, charging energy to a charging interface connected to an energy storage apparatus that requires a long time to be fully charged.

Alternatively, the second characteristic parameter is an output voltage of an energy storage apparatus, and when the energy storage apparatus has a higher voltage, the determining result of the priority setting module is that the energy storage apparatus needs a shorter charging time.

Alternatively, in the second charging mode, the charging circuit first outputs charging energy to the first charging interface, and after the control circuit detects that the first energy storage apparatus is fully charged, the charging circuit is controlled to output charging energy to the second charging interface.

Alternatively, in the first charging mode, the first charging interface is connected to the second charging interface in parallel.

Alternatively, the charging apparatus comprises an adapter housing and a charging base housing, the power supply conversion circuit is disposed in the adapter housing, the charging circuit and the control circuit are at least partially disposed in the charging base housing, the first charging interface and the second charging interface are disposed on the charging base housing, and the adapter housing and the charging base housing are separate from each other and are connected through an electrical cable.

To resolve the foregoing technical problem, the present embodiments further provide a charging system.

Specific technical solutions are as follows: A charging system, comprising a charging apparatus and an energy storage apparatus, wherein the energy storage apparatus at least comprises a first energy storage apparatus and a second energy storage apparatus detachably connected to the charging apparatus; and the charging apparatus comprises: a first charging interface, detachably connected to the first energy storage apparatus; a second charging interface, detachably connected to the second energy storage apparatus, wherein at the same time when the first energy storage apparatus is connected to the first charging interface, the second charging interface may be connected to the second energy storage apparatus; a power supply conversion circuit, converting external power supply into charging energy; a charging circuit, outputting charging energy output by the power supply conversion circuit to the first charging interface and the second charging interface, wherein the charging circuit comprises a first charging mode and a second charging mode, in the first charging mode, the charging circuit outputs charging energy to both the first charging interface and the second charging interface, and in the second charging mode, the charging circuit selectively outputs charging energy to the first charging interface or the second charging interface; and a control circuit, selectively sending a first signal or a second signal to the charging circuit, wherein when the control circuit sends the first signal, the charging circuit is in the first charging mode; and when the control circuit sends the second signal, the charging circuit is in the second charging mode.

Alternatively, the charging apparatus further comprises an adjustable setting apparatus operated by a user, the adjustable setting apparatus is operable to send different signals to the control circuit, and the control circuit sends the first signal or the second signal to the charging circuit according to a signal sent by the adjustable setting apparatus.

Alternatively, the control circuit further comprises a priority setting module, in the second charging mode, the charging circuit sequentially outputs charging energy to the first charging interface and the second charging interface, and the charging circuit sets, according to a signal sent by the priority setting module, an order of outputting charging energy to the first charging interface and the second charging interface.

To resolve the foregoing technical problem, the present embodiments further provide a charging method.

Specific technical solutions are as follows: A charging method, capable of charging at least two energy storage apparatuses, wherein the charging method comprises the following steps: S1: confirming that a first energy storage apparatus is connected to a charging apparatus; S2: confirming that a second energy storage apparatus is connected to the charging apparatus; and S3: entering a first charging mode or a second charging mode, wherein in the first charging mode, both the first energy storage apparatus and the second energy storage apparatus are charged; and in the second charging mode, the first energy storage apparatus or the second energy storage apparatus is selectively charged.

Alternatively, the charging method further comprises the following step before step S3: S4: detecting a signal sent by an adjustable setting apparatus operated by a user, and choosing, according to the signal of the adjustable setting apparatus, to enter the first charging mode or the second charging mode.

Alternatively, after the second charging mode is entered, a charging circuit sequentially outputs charging energy to a first charging interface and a second charging interface, and the charging method further comprises the following step: S5: detecting a second characteristic parameter of the first energy storage apparatus and the second energy storage apparatus, and setting, according to the detection result, an order of outputting charging energy to the first energy storage apparatus and the second energy storage apparatus.

The beneficial effects achieved by implementing the present embodiments are as follows: A control circuit selectively sends a first signal or a second signal to a charging circuit, and the charging circuit enters a first charging mode or a second charging mode according to a signal sent by the control circuit, so that different charging modes are provided according to different requirements, thereby satisfying varied charging requirements.

DETAILED DESCRIPTION

Figure 1:
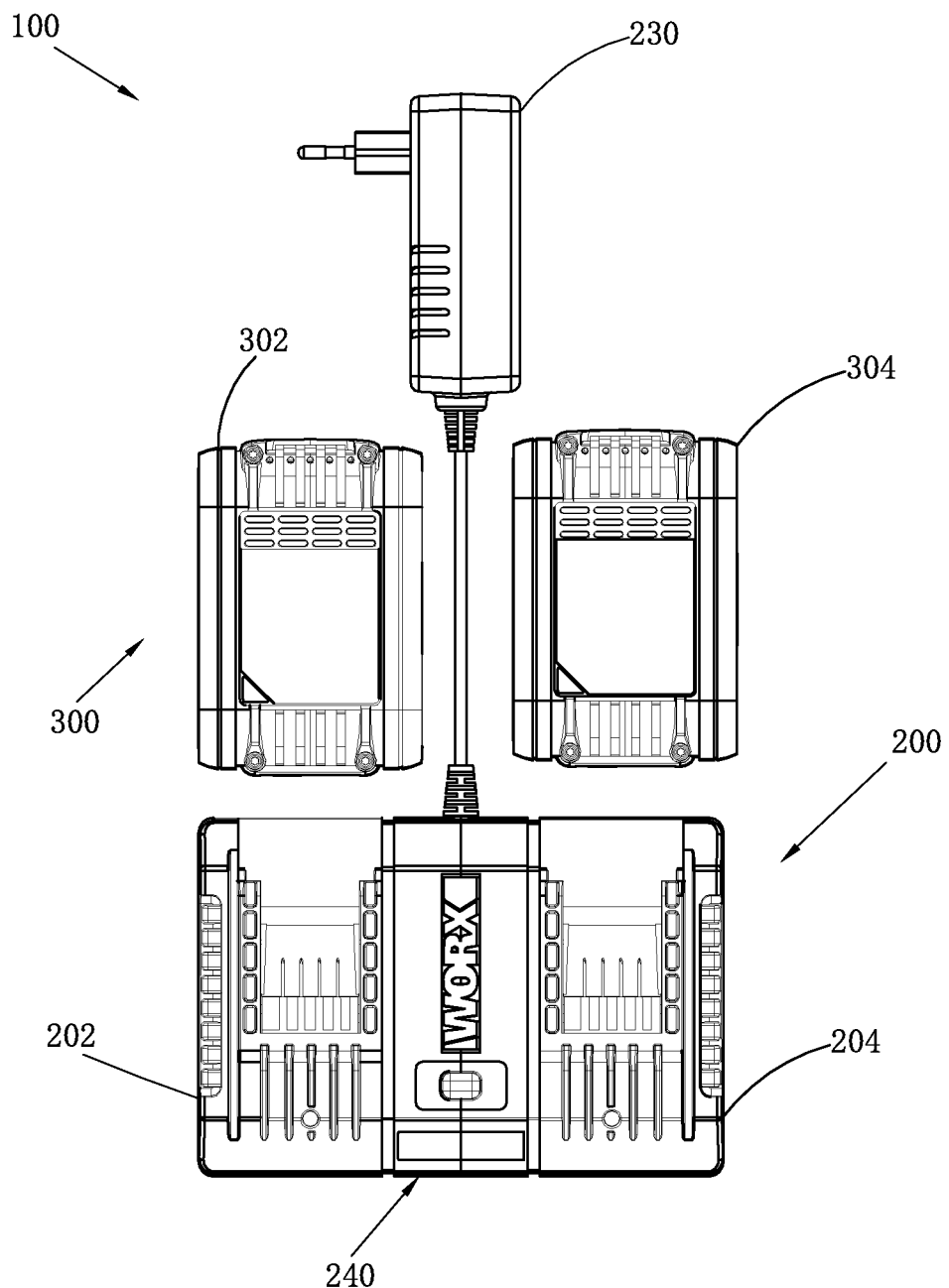
FIG. 1 is an overall diagram of a charging system according to a preferred implementation.

100 Charging system
200 Charging apparatus
202 First charging interface
204 Second charging interface
205 Power supply conversion circuit
206 Charging circuit
208 Control circuit
210 Detection circuit
212 Adjustable setting apparatus
214 First manual trigger switch
216 Second manual trigger switch
218 Third manual trigger switch
220 First one-way current valve
222 Second one-way current valve
224 Priority setting module
230 Adapter housing
240 Charging base housing
242 First indicator lamp
244 Second indicator lamp
246 Third indicator lamp
250 Electrical cable
300 Energy storage apparatus
302 First energy storage apparatus
304 Second energy storage apparatus The detailed description and technical content of the present embodiments are described below with reference to the accompanying drawings. However, the accompanying drawings only provide reference and description and are not used to limit the present embodiments.

As shown in FIG. 1, a charging system 100 includes a charging apparatus 200 and an energy storage apparatus 300. The energy storage apparatus 300 is detachably connected to the charging apparatus 200 to acquire charging energy from the charging apparatus 200. The charging apparatus 200 includes a first charging interface 202 and a second charging interface 204. The first charging interface 202 and the second charging interface 204 are disposed independently of each other. The energy storage apparatus 300 includes a first energy storage apparatus 302 and a second energy storage apparatus 304. At the same time when the first energy storage apparatus 302 is connected to the first charging interface 202, the second energy storage apparatus 304 can be connected to the second charging interface 204. In another embodiment, the charging apparatus 200 may further include more charging interfaces, for example, a third charging interface, a fourth charging interface, and the like. The energy storage apparatus 300 may include more energy storage apparatuses, for example, a third energy storage apparatus, a fourth energy storage apparatus, and the like.

Figure 2:
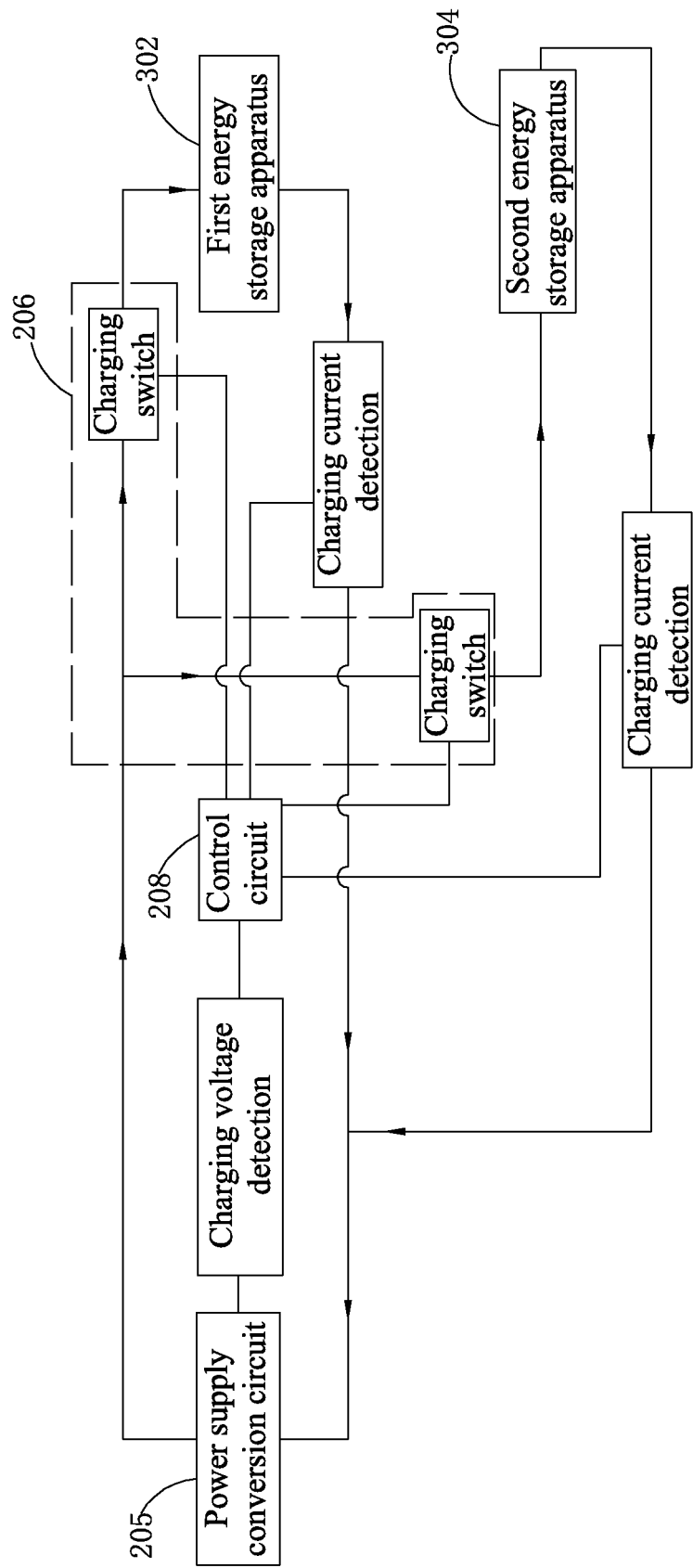
FIG. 2 is a circuit module diagram of a first preferred embodiment of a charging apparatus.

FIG. 2 is a circuit module diagram of a first preferred embodiment of a charging apparatus. The charging apparatus 200 further includes a power supply conversion circuit 205, a charging circuit 206, and a control circuit 208. The power supply conversion circuit 205 converts external power supply into charging energy. The charging circuit 206 outputs charging energy output by the power supply conversion circuit 205 to the first charging interface 202 and the second charging interface 204. The charging circuit 206 includes a first charging mode and a second charging mode. The charging circuit 206 supplies power to both the first charging interface 202 and the second charging interface 204 in the first charging mode. The charging circuit 206 selectively supplies charging energy to the first charging interface 202 or the second charging interface 204 in the second charging mode. In a specific embodiment, the charging circuit 206 includes a charging switch connected between the first charging interface 202 and the power supply conversion circuit 205 and a charging switch connected between the second charging interface 204 and the power supply conversion circuit 205. The charging apparatus 200 further includes the control circuit 208 electrically connected to the charging circuit 206. The control circuit 208 selectively sends a first signal or a second signal to the charging circuit 206. When the control circuit 208 sends the first signal, the charging circuit 206 is in the first charging mode. When the control circuit 208 sends the second signal, the charging circuit 206 is in the second charging mode.

The control circuit 208 may generate the first signal or the second signal according to a characteristic of an energy storage apparatus or a special requirement of a user, specifically: 1) according to a characteristic parameter of an energy storage apparatus 300 connected to a charging interface; or 2) according to an input signal on a human-computer interaction interface disposed on the charging apparatus 200.

Figure 3:
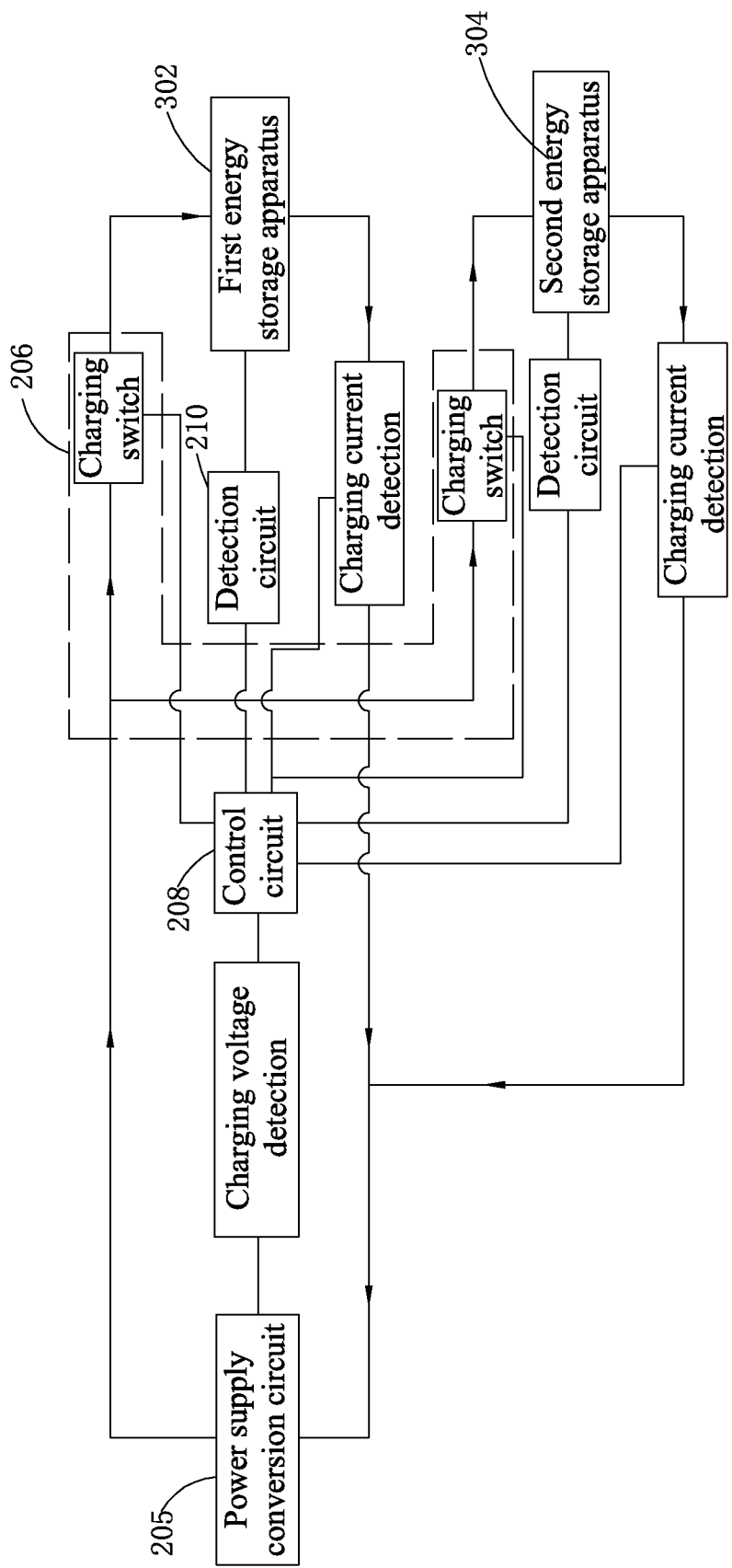
FIG. 3 is a circuit module diagram of a second preferred embodiment of a charging apparatus.

FIG. 3 is a circuit module diagram of a second preferred embodiment of the charging apparatus 200. In this embodiment, the control circuit 208 selectively sends the first signal or the second signal to the charging circuit 206 according to a characteristic parameter of an energy storage apparatus 300 connected to the charging interface. Specifically, in this embodiment, the charging apparatus 200 is basically the same as the charging apparatus 200 in FIG. 2, and an improvement lies in that the charging apparatus 200 in this embodiment further includes a detection circuit 210 electrically connected to the control circuit 208. The detection circuit 210 detects a first characteristic parameter of an energy storage apparatus 300 connected to the charging interface, and sends the detection result to the control circuit 208. The control circuit 208 sends the first signal or the second signal to the charging circuit 206 according to the detection result. The first characteristic parameter may be an output voltage, a capacity, a chemical property, a temperature of an energy storage apparatus 300, or parameters representing a single energy storage unit of the energy storage apparatus 300. In a specific embodiment, the first characteristic parameter is the output voltage of the energy storage apparatus 300. Specifically, the detection circuit 210 detects an output voltage of the first energy storage apparatus 302 and an output voltage of the second energy storage apparatus 304. When a difference between the output voltage of the first energy storage apparatus 302 and the output voltage of the second energy storage apparatus 304 does not exceed a first preset voltage difference, the control circuits 208 controls the charging circuit 206 to enter the first charging mode. Otherwise, when the difference between the output voltage of the first energy storage apparatus 302 and the output voltage of the second energy storage apparatus 304 exceeds the first preset voltage difference, the control circuits 208 controls the charging circuit 206 to enter the second charging mode.

Figure 4:
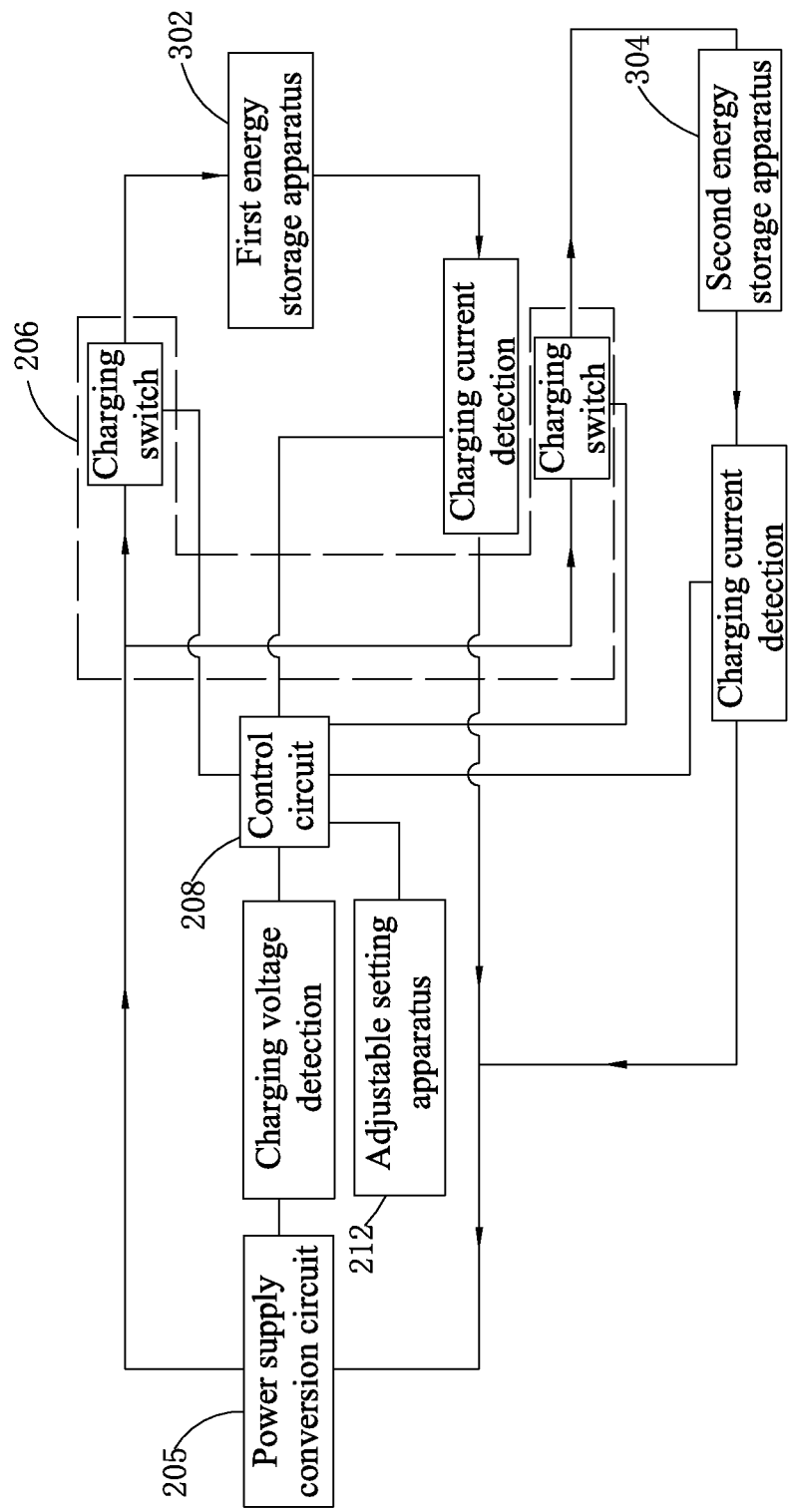
FIG. 4 is a circuit module diagram of a third preferred embodiment of a charging apparatus.

FIG. 4 is a circuit module diagram of a third preferred embodiment of the charging apparatus 200. In this embodiment, the control circuit 208 selectively sends the first signal or the second signal to the charging circuit 206 according to an input signal on a human-computer interaction interface disposed on the charging apparatus 200. Specifically, in this embodiment, the charging apparatus 200 is basically the same as the charging apparatus 200 in FIG. 2, and an improvement lies in that the charging apparatus 200 in this embodiment further includes a human-computer interaction interface. The human-computer interaction interface receives operation information of a user, and determines, according to the operation information of the user, that the control circuit 208 sends the first signal or the second signal, to enable the charging circuit 206 to enter the first charging mode or the second charging mode, thereby satisfying a special requirement of the user. In this embodiment, the human-computer interaction interface includes an adjustable setting apparatus 212 operated by the user. The adjustable setting apparatus 212 is operable to send different signals to the control circuit 208. The control circuit 208 sends the first signal or the second signal to the charging circuit 206 according to a signal sent by the adjustable setting apparatus 212. The adjustable setting apparatus 212 may be a trigger switch, a sound control apparatus, a remote communications apparatus, and the like. The remote communications apparatus may communicate with a remote intelligent device. An operator selects a charging mode of the charging circuit 206 by operating the intelligent device. The selection result of the operator is sent to the adjustable setting apparatus 212 (that is, the remote communications apparatus) on the charging apparatus 200 via the intelligent device, and the signal is further transferred to the control circuit 208. The control circuit 208 controls, according to the signal sent by the adjustable setting apparatus 212, the charging circuit 206 to enter the first charging mode or the second charging mode.

Figure 5:
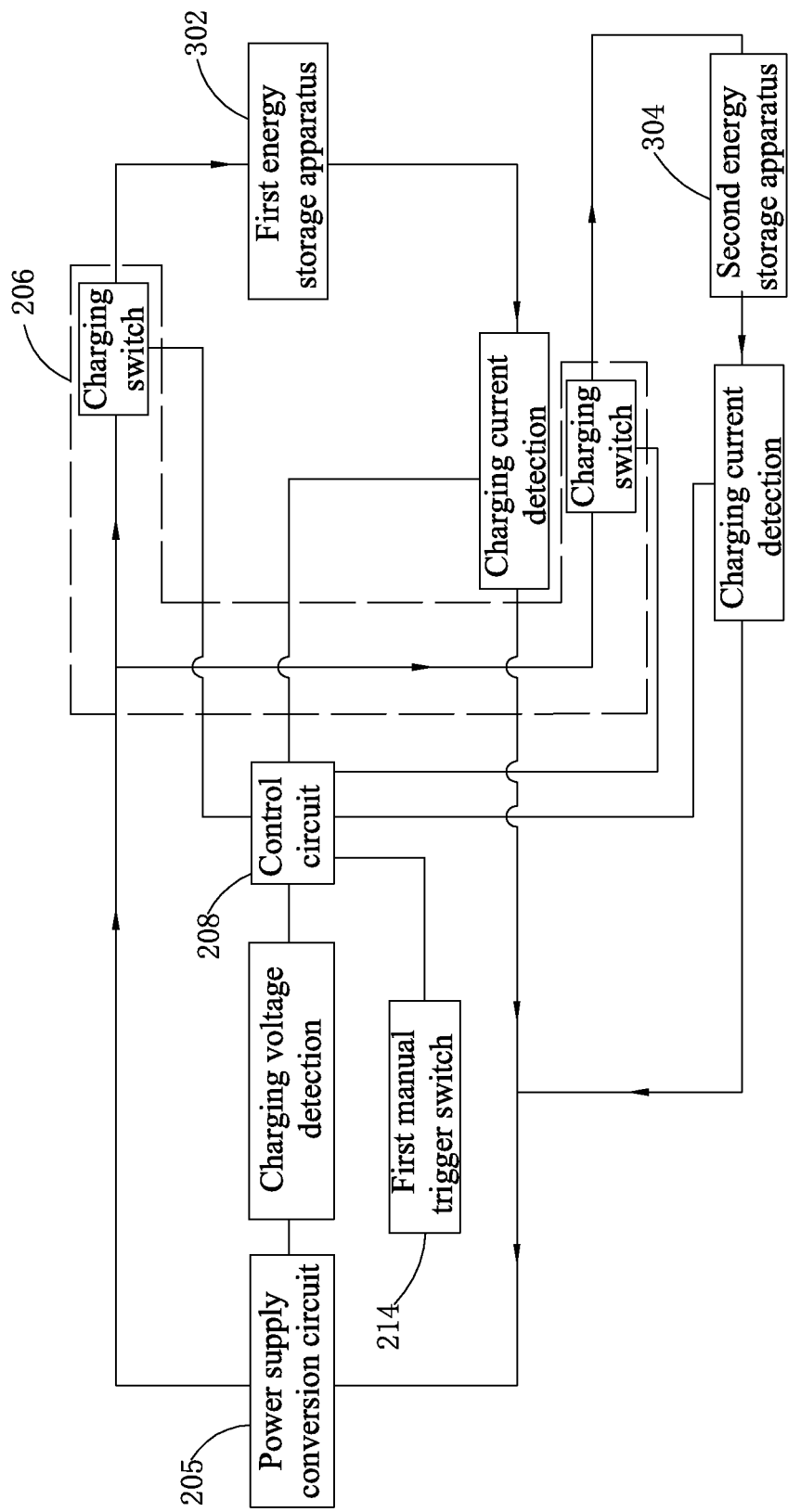
FIG. 5 is a circuit module diagram of a fourth preferred embodiment of a charging apparatus.

FIG. 5 is a circuit module diagram of a fourth preferred embodiment of the charging apparatus. A difference between this embodiment and the embodiment shown in FIG. 4 lies in that the adjustable setting apparatus 212 includes a first manual trigger switch 214. When the first manual trigger switch is triggered, the control circuit 208 sends the second signal, to enable the charging circuit 206 to enter the second charging mode. When the first manual trigger switch is not triggered, the control circuit 208 sends the first signal, to enable the charging circuit 206 to enter the first charging mode.

Figure 6:
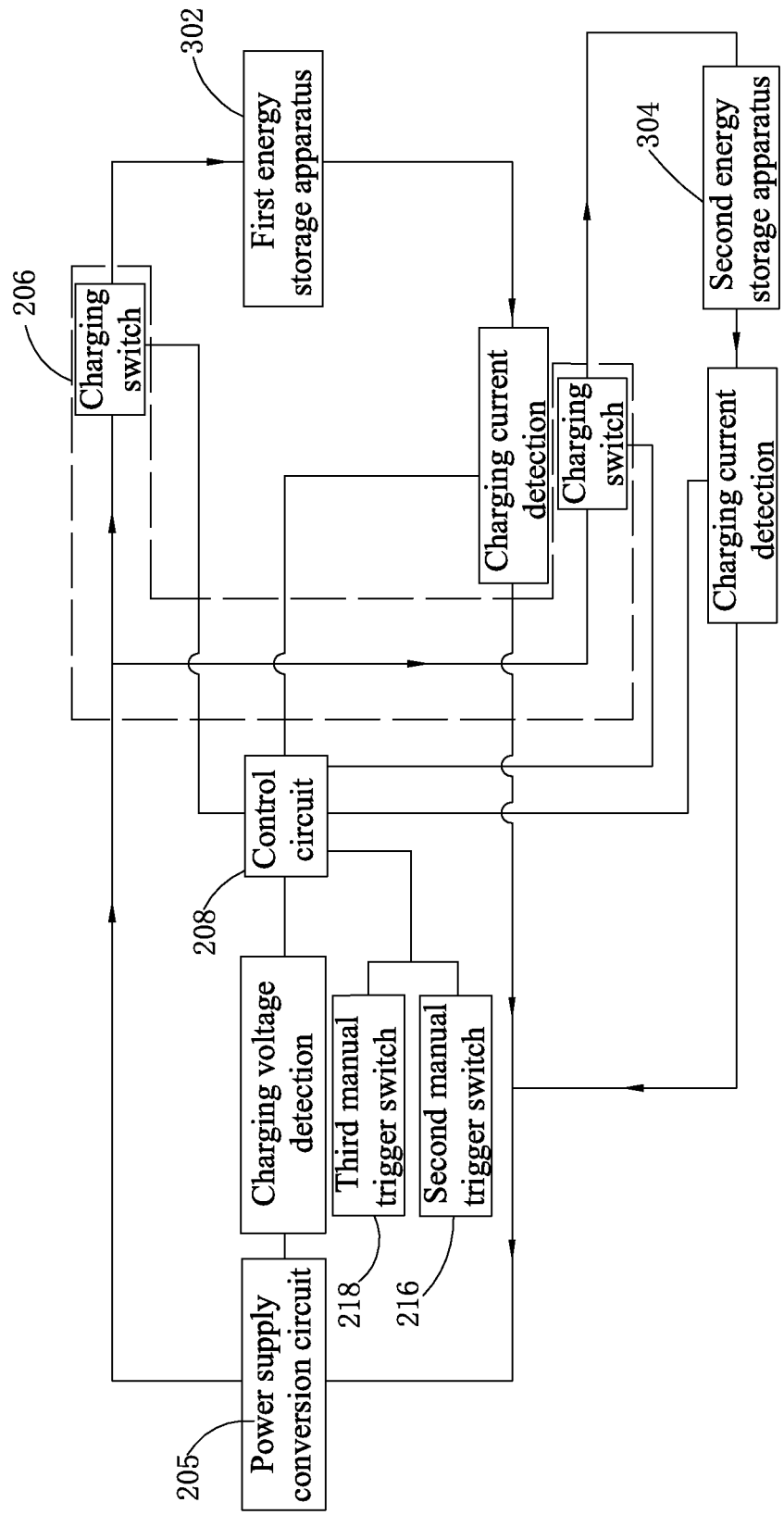
FIG. 6 is a circuit module diagram of a fifth preferred embodiment of a charging apparatus.

FIG. 6 is a circuit module diagram of a fifth preferred embodiment of the charging apparatus. A difference between this embodiment and the embodiment shown in FIG. 4 lies in that the adjustable setting apparatus 212 includes a second manual trigger switch 216 and a third manual trigger switch 218. When one of the second manual trigger switch 216 and the third manual trigger switch 218 is triggered, the control circuit 208 sends the second signal, to enable the charging circuit 206 to enter the second charging mode. When neither the second manual trigger switch 216 nor the third manual trigger switch 218 is triggered or both the second manual trigger switch 216 and the third manual trigger switch 218 are triggered, the control circuit 208 sends the first signal, to enable the charging circuit 206 to enter the first charging mode. In the second charging mode, when the second manual trigger switch 216 is triggered, charging energy is first supplied to the first charging interface 202, and when an energy storage apparatus 300 connected to the first charging interface 202 is fully charged, charging energy is then supplied to the second charging interface 204. Otherwise, in the second charging mode, when the third manual trigger switch 218 is triggered, charging energy is first supplied to the second charging interface 204, and when an energy storage apparatus 300 connected to the second charging interface 204 is fully charged, charging energy is then supplied to the first charging interface 202.

Figure 7:
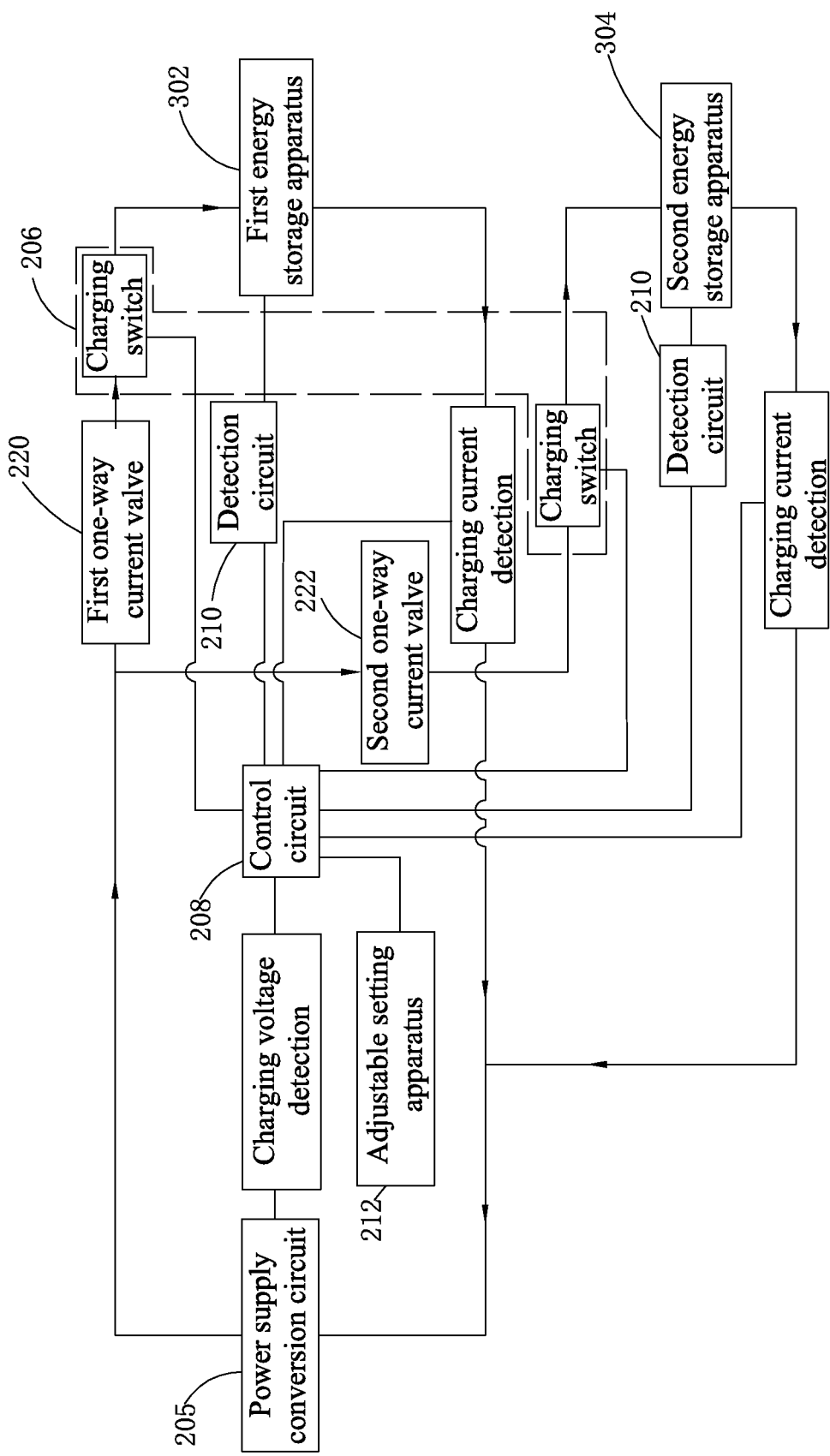
FIG. 7 is a circuit module diagram of a sixth preferred embodiment of a charging apparatus.

FIG. 7 is a circuit module diagram of a sixth preferred embodiment of charging apparatus 200 according to the present embodiments. In this embodiment, the charging apparatus 200 includes a power supply conversion circuit 205, a control circuit 208, a charging circuit 206, an adjustable setting apparatus 212, and a detection circuit 210. The functions and settings of the power supply conversion circuit 205, the control circuit 208, and the charging circuit 206 are as discussed above. The adjustable setting apparatus 212 sets a charging mode of the charging circuit 206. The detection circuit 210 detects a charging parameter of an energy storage apparatus 300, and the control circuit 208 determines, according to the detection result of the detection circuit 210, whether to continue supplying charging energy to the energy storage apparatus 300. The charging parameter may be a charging temperature, a fault status, a status of a single energy storage unit included in the energy storage apparatus 300 or the like. In this embodiment, the charging apparatus 200 further includes a first one-way current valve 220 disposed between the charging circuit 206 and the first charging interface 202 and a second one-way current valve 222 disposed between the charging circuit 206 and the second charging interface 204. The first one-way current valve 220 and the second one-way current valve 222 respectively allow currents to flow from the power supply conversion circuit 205 to the first charging interface 202 and the second charging interface 204 and respectively prevent currents from flowing from the first charging interface 202 and the second charging interface 204 to the power supply conversion circuit 205. Alternatively, the first one-way current valve 220 and the second one-way current valve 222 are diodes.

Different embodiments of the first charging mode and the second charging mode are described below in detail. It should be noted herein that different embodiments of the circuit block diagram of the charging apparatus 200 described above may be flexibly combined with different charging modes described below.

Alternatively, as shown in FIG. 2, in the first charging mode, the first energy storage apparatus 302 and the second energy storage apparatus 304 are connected in parallel and charged simultaneously until the first energy storage apparatus 302 and the second energy storage apparatus 304 are fully charged. In another embodiment, the first energy storage apparatus 302 and the second energy storage apparatus 304 are connected in series and are charged simultaneously until the first energy storage apparatus 302 and the second energy storage apparatus 304 are fully charged.

The charging circuit 206 outputs charging energy to the first charging interface 202 or the second charging interface 204 in the second charging mode instead of supplying charging energy to both the first charging interface 202 and the second charging interface 204. Alternatively, the charging circuit 206 sequentially outputs charging energy to the first charging interface 202 and the second charging interface 204 in a particular order. Therefore, a problem that needs to be resolved is to determine whether charging energy is first output to the first charging interface 202 or charging energy is first output to the second charging interface 204.

Based on this, the present embodiments provide the following case. In the first case, charging energy is supplied to specific charging interfaces in a fixed order. In the second case, an order of supplying charging energy to specific charging interfaces is set according to characteristics of energy storage apparatuses or a special requirement of a user.

In the first case, a charging order position of each charging interface is stored in advance in the control circuit 208, and a corresponding control signal is sent to the charging circuit 206, so that the charging circuit 206 supplies charging energy to the specific charging interfaces in the fixed order. For example, the first charging interface 202 is a first charging order position, and the second charging interface 204 is a second charging order position. In this case, when energy storage apparatuses 300 are connected to both the first charging interface 202 and the second charging interface 204, the charging circuit 206 supplies charging energy to the first charging interface 202 first until the energy storage apparatus 300 connected to the first charging interface 202 is fully charged, charging energy is then supplied to the second charging interface 204 until the energy storage apparatus 300 connected to the second charging interface 204 is fully charged, and the output of charging energy is then stopped.

Figure 8:
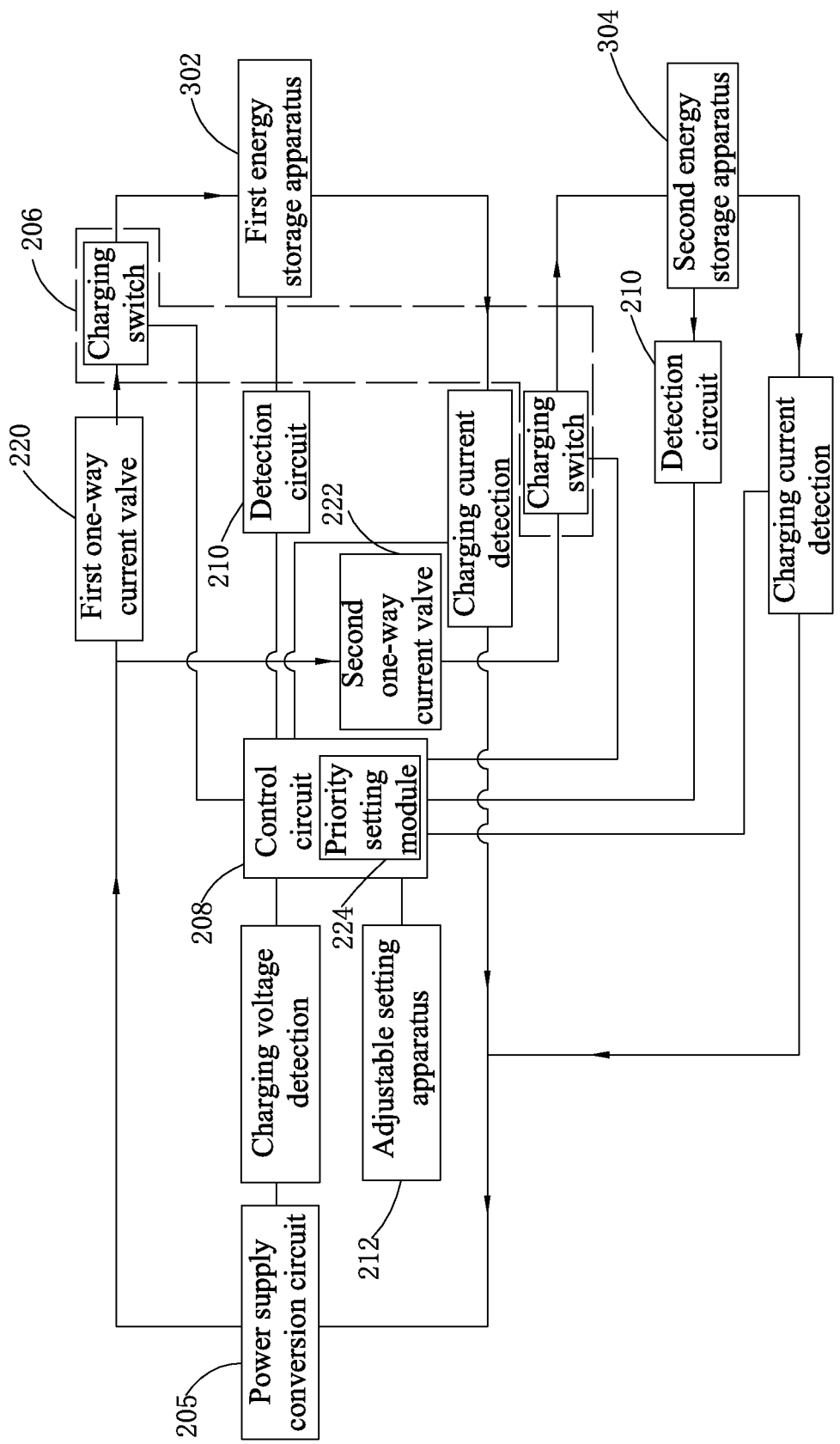
FIG. 8 is a circuit module diagram of a seventh preferred embodiment of a charging apparatus.

FIG. 8 is a circuit module diagram of a seventh preferred embodiment of the charging apparatus 200. In this embodiment, the charging apparatus 200 sets an order of supplying charging energy to charging interfaces according to characteristics of energy storage apparatuses or a special requirement of a user. Based on this, the basic structure of the charging apparatus 200 is basically the same as that in the embodiment shown in FIG. 7, and an improvement lies in that in this embodiment, the control circuit 208 of the charging apparatus 200 further includes a priority setting module 224. The priority setting module 224 sets, according to characteristics of energy storage apparatuses or a special requirement of a user, an order of supplying charging energy to specific charging interfaces. The charging circuit 206 sets, according to a signal sent by the priority setting module 224, an order of supplying charging energy to the first charging interface 202 and the second charging interface 204. The characteristic of the energy storage apparatus or the special requirement of the user specifically includes: 1) characteristic parameters of energy storage apparatuses 300; and 2) an input signal on the human-computer interaction interface disposed on the charging apparatus 200. When a charging order is set according to a characteristic parameter of the energy storage apparatus 300, the priority setting module 224 detects a second characteristic parameter of an energy storage apparatus 300 connected to the first charging interface 202 and a second characteristic parameter of an energy storage apparatus 300 connected to the second charging interface 204, and sends a signal to the charging circuit 206 according to the detection result. Alternatively, the priority setting module 224 may recognize, according to the detection result of the second characteristic parameter, a time needed to fully charge the energy storage apparatus 300. For example, the second characteristic parameter is an output voltage of an energy storage apparatus 300. When the energy storage apparatus 300 has a higher voltage, the priority setting module 224 recognizes that a shorter time is needed to fully charge the energy storage apparatus 300. Otherwise, the priority setting module 224 recognizes that a longer time is needed to fully charge the energy storage apparatus 300. For another example, the second characteristic parameter is a nominal capacity of the energy storage apparatus 300 and the output voltage of the energy storage apparatus 300, where the nominal capacity may be recognized according to a capacity label element. The output voltage may be recognized by detecting a voltage between positive and negative electrodes of the energy storage apparatus 300. The priority setting module 224 combines the nominal capacity and the voltage to determine and recognize a time needed to fully charge the energy storage apparatus 300. Further alternatively, when the detection result of the priority setting module 224 is that the energy storage apparatus 300 connected to the first charging interface 202 needs a short charging time, the charging circuit 206 first supplies power to the first charging interface 202. When the detection result of the priority setting module 224 is that the energy storage apparatus 300 connected to the second charging interface 204 needs a short charging time, the charging circuit 206 first supplies power to the second charging interface 204. The second characteristic parameter may further be a temperature or a chemical property of the energy storage apparatus 300, parameters of a single energy storage unit included in the energy storage apparatus 300, or the like. When a charging order is set according to an input signal on the human-computer interaction interface disposed on the charging apparatus 200, the charging apparatus 200 includes an adjustable priority setting apparatus operated by a user. The adjustable priority setting apparatus is operable to send different signals. The priority setting module 224 sets, according to a signal sent by the adjustable priority setting apparatus, an order in which the charging circuit 206 supplies charging energy to the charging interfaces, generates a corresponding signal, and sends the signal to the charging circuit 206. In a specific embodiment, the adjustable priority setting apparatus includes two trigger switches. A status of the first trigger switch corresponds to a charging order position of the first charging interface 202, and a status of the second trigger switch corresponds to a charging order position of the second charging interface 204. When the first trigger switch is triggered, charging energy is first supplied to the first charging interface 202. When the second trigger switch is triggered, charging energy is first supplied to the second charging interface 204. In another embodiment, the adjustable priority setting apparatus may further be a sound control apparatus, a remote communications apparatus or the like. The remote communications apparatus may communicate with a remote intelligent device. An operator operates the intelligent device to select an order in which the charging circuit 206 supplies charging energy to the energy storage apparatus. The selection result of the operator is sent to the adjustable priority setting apparatus (that is, the remote communications apparatus) on the charging apparatus 200 via the intelligent device. The priority setting module 224 sets, according to the signal sent by the adjustable priority setting apparatus, the order in which the charging circuit 206 supplies charging energy to the charging interfaces.

Figure 9:
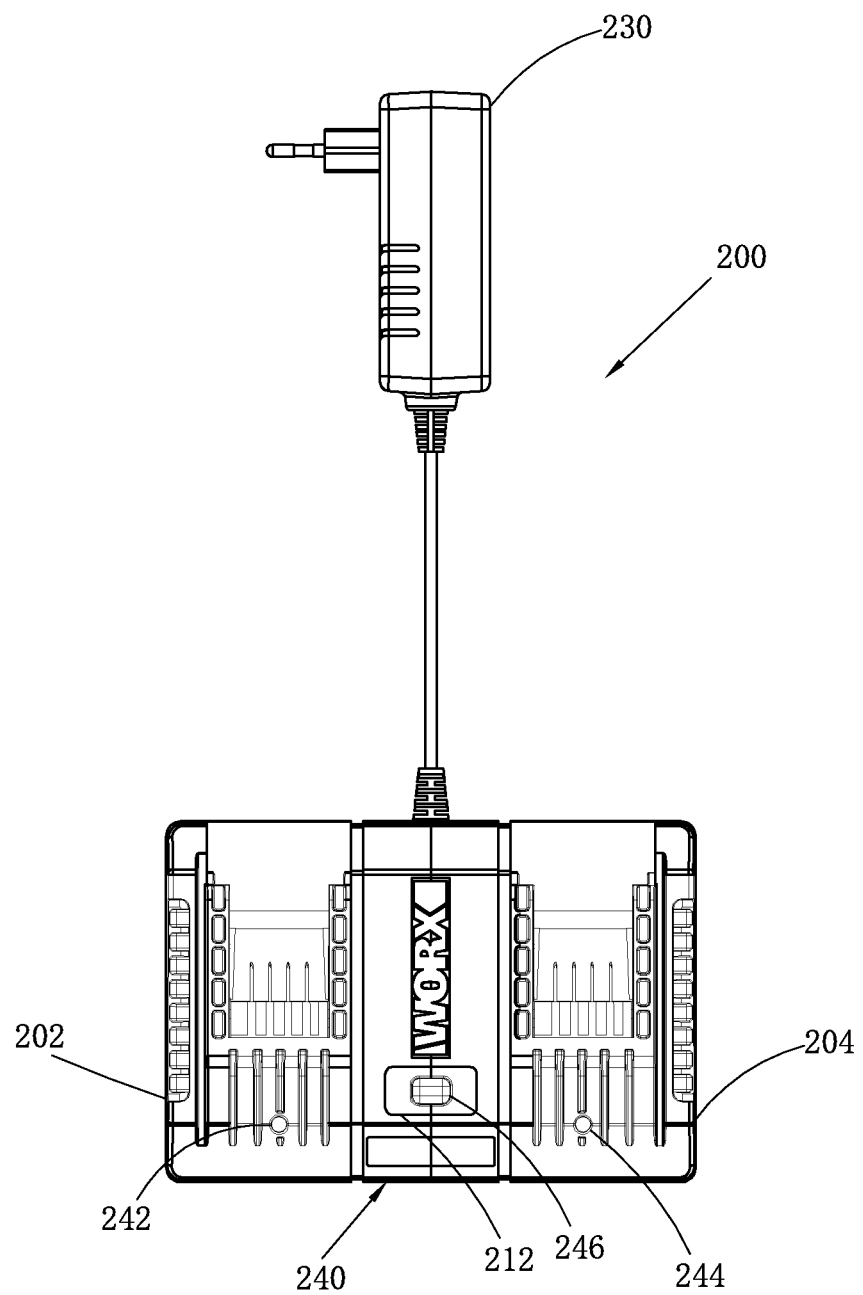
FIG. 9 is a structural block diagram of the first preferred embodiment of the charging apparatus.

FIG. 9 is a structural block diagram of a preferred embodiment of the charging apparatus 200. The charging apparatus 200 includes an adapter housing 230 and a charging base housing 240. The adapter housing 230 and the charging base housing 240 are separate from each other and are connected through an electrical cable 250. The power supply conversion circuit 205 is disposed in the adapter housing 230. The charging circuit 206 and the control circuit 208 are at least partially disposed in the charging base housing 240. The first charging interface 202 and the second charging interface 204 are disposed on the charging base housing 240. In an embodiment, the electrical cable 250 is fixedly disposed on the adapter housing 230 and is detachably disposed on the charging base housing 240. A circuit module diagram in this embodiment may be the circuit module diagram in any foregoing embodiment.

The first charging interface 202 and the second charging interface 204 have the same slide rail structure and the same terminal structure. In another embodiment, the first charging interface 202 and the second charging interface 204 may have different slide rail structures and/or different terminal structures. In the case of different terminal structures and/or different slide rail structures, an energy storage apparatus that can be connected to the first charging interface 202 and an energy storage apparatus that can be connected to the second charging interface 204 have different types, so that the charging apparatus 200 charge various energy storage apparatuses 300, thereby improving the compatibility of the charging apparatus 200.

In a specific embodiment, a circuit module diagram of the charging apparatus 200 shown in FIG. 9 is a circuit module diagram of the fourth preferred embodiment shown in FIG. 5. Based on this, the charging apparatus 200 shown in FIG. 9 further includes an adjustable setting apparatus 212 disposed on the charging base housing 240. In a specific embodiment, the adjustable setting apparatus 212 is a first manual trigger switch 214. When the first manual trigger switch 214 is triggered, the charging circuit 206 enters the first charging mode. When the first manual trigger switch 214 is triggered again, the charging circuit 206 enters the second charging mode. When the first manual trigger switch 214 is triggered again, the charging circuit 206 returns to the first charging mode. After the charging circuit 206 enters a charging mode, the energy storage apparatus 300 is charged in the charging mode, and the mode is no longer switched unless the signal sent by the adjustable setting apparatus 212 is changed.

The charging apparatus 200 further includes a first indicator lamp 242 disposed near the first charging interface 202, a second indicator lamp 244 disposed near the second charging interface 204, and a third indicator lamp 246 that indicates a state of the adjustable setting apparatus 212. The first indicator lamp 242 is switched on when the charging circuit 206 supplies charging energy to the first charging interface 202. The second indicator lamp 244 is switched on when the charging circuit 206 supplies charging energy to the second charging interface 204. The third indicator lamp 246 is switched on when the adjustable setting apparatus 212 is triggered.

For a working manner of the charging circuit 206 in the first charging mode or the second charging mode, reference may be made to any working manner described above. In a specific embodiment, the charging circuit 206 supplies charging energy to the first charging interface 202 and the second charging interface 204 in parallel in the first charging mode. In the second charging mode, the charging apparatus 200 includes a priority setting module 224. The priority setting module 224 detects a second characteristic parameter of an energy storage apparatus 300 connected to the first charging interface 202 and a second characteristic parameter of an energy storage apparatus 300 connected to the second charging interface 204, and sends a signal to the charging circuit 206 according to the detection result. The charging circuit 206 sets, according to the signal sent by the priority setting module 224, an order of supplying charging energy to the first charging interface 202 and the second charging interface 204. The second characteristic parameter may use any case in the foregoing. In a specific embodiment, the second characteristic parameter is an output voltage of an energy storage apparatus 300, and the charging circuit 206 first supplies charging energy to an energy storage apparatus 300 with a relatively high output voltage, then supplies, after the energy storage apparatus 300 is fully charged, charging energy to an energy storage apparatus 300 with a relatively low output voltage until the energy storage apparatus 300 is fully charged, and ends the charging process.

In another embodiment, only one charging housing may be included in a structural block diagram of the charging apparatus 200. The power supply conversion circuit 205, the charging circuit 206, the control circuit 208, and the like are all disposed in the charging housing. The charging interface is also correspondingly disposed on the charging housing.

Figure 10:
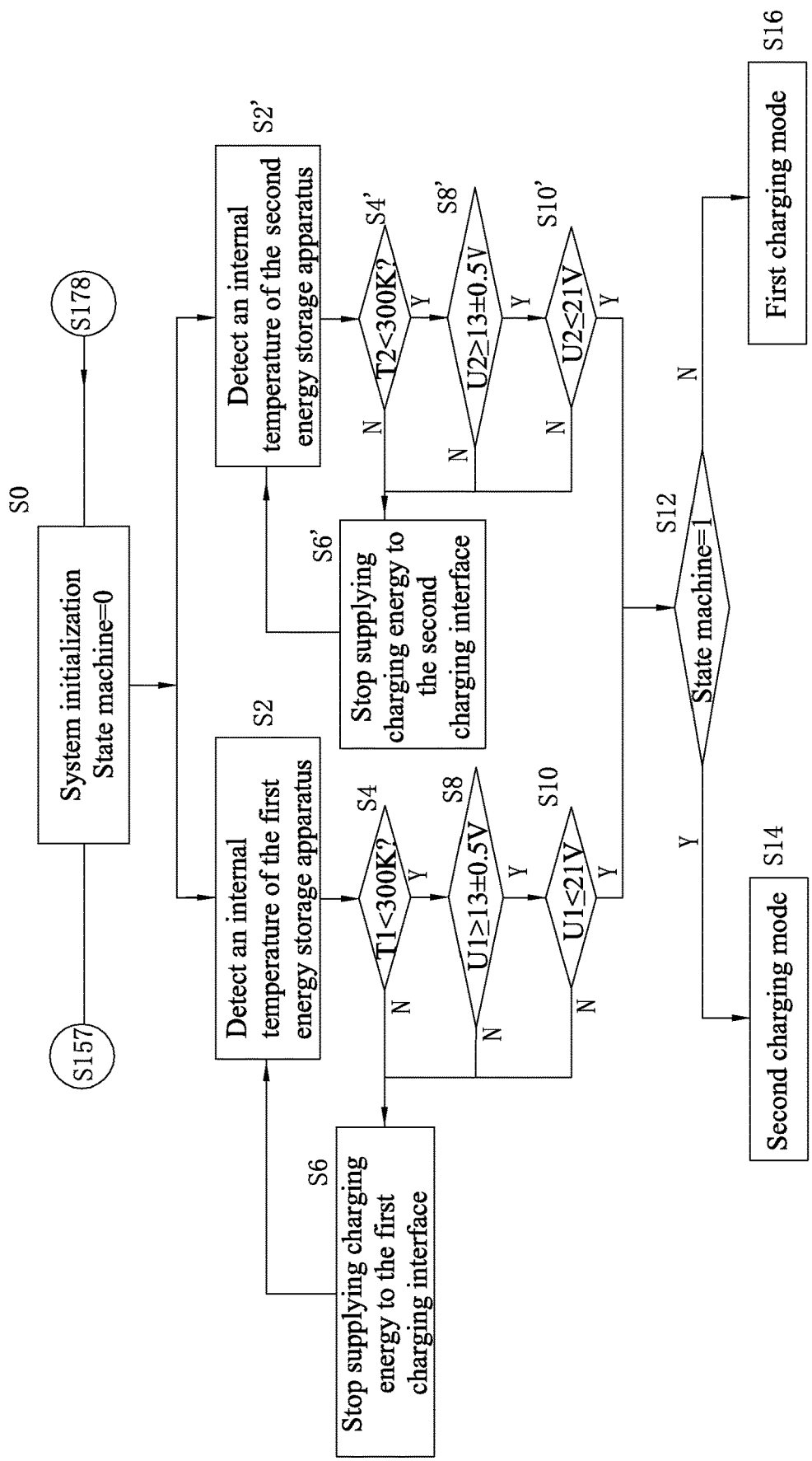
FIG. 10 is a working flowchart of the first preferred embodiment of the charging apparatus.
Figure 11:
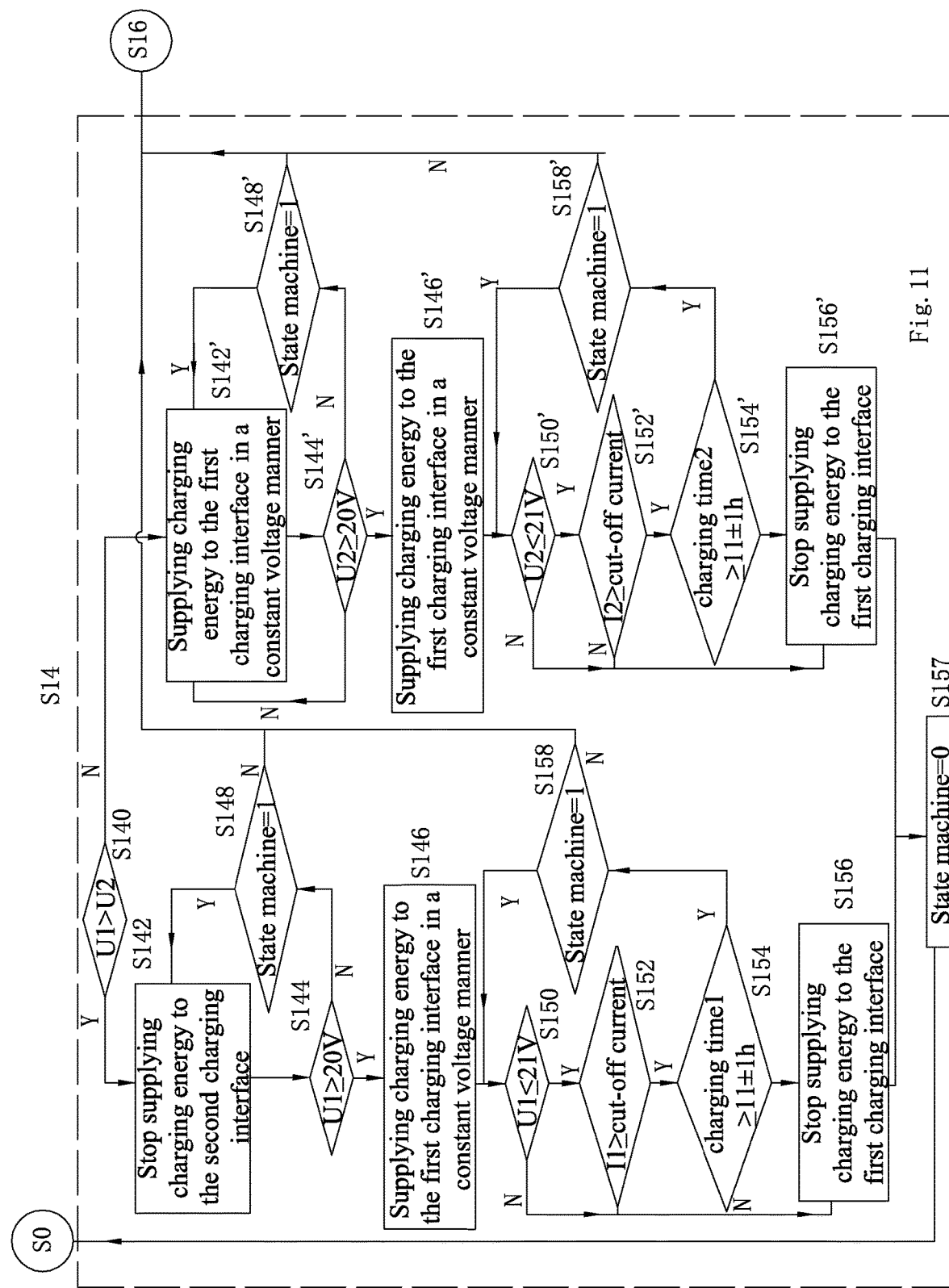
FIG. 11 is a sub-flowchart of the working flowchart of the first preferred embodiment of the charging apparatus.
Figure 12:
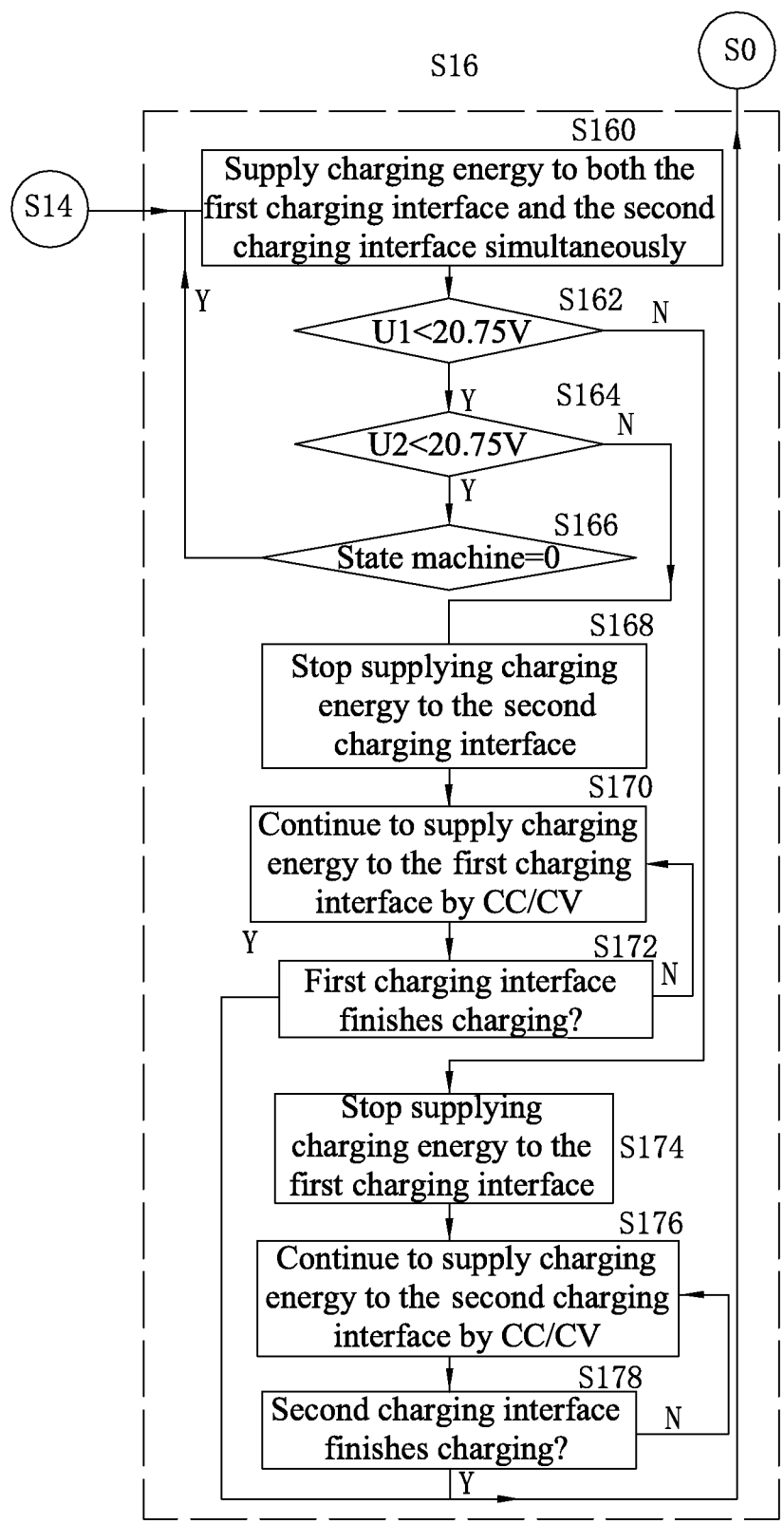
FIG. 12 is a sub-flowchart of the working flowchart of the first preferred embodiment of the charging apparatus.

FIG. 10 to FIG. 12 are flowcharts. An embodiment of the charging apparatus corresponding to the flowcharts is as follows: The adjustable setting apparatus 212 selects a charging mode for the charging circuit 206. The charging circuit 206 supplies charging energy to the first charging interface 202 and the second charging interface 204 in parallel in the first charging mode, and supplies charging energy first to an energy storage apparatus 300 with a high output voltage in the second charging mode. In another embodiment of the charging apparatus 200, a corresponding charging method may be improved based on the flowcharts in FIG. 10 to FIG. 12. Details are not described herein again.

Step S0: System initialization: Set the value of statemachine to 0, where statemachine represents the signal sent by the adjustable setting apparatus 212. 0 represents that the signal sent by the adjustable setting apparatus 212 is A. Correspondingly, the third indicator lamp 246 that indicates the state of the adjustable setting apparatus 212 is in an off state. After receiving the signal A sent by the adjustable setting apparatus 212, the control circuit 208 controls the charging circuit 206 to enter the first charging mode. 1 represents that the signal sent by the adjustable setting apparatus 212 is B. Correspondingly, the third indicator lamp 246 that indicates the state of the adjustable setting apparatus 212 is in an on state. After receiving the signal B sent by the adjustable setting apparatus 212, the control circuit 208 controls the charging circuit 206 to enter the second charging mode. After step S0, the process turns to Steps S2 and S2'.

Steps S2 and S2': A temperature detection terminal shown in FIG. 2 detects an internal temperature of the first energy storage apparatus 302 and an internal temperature of the second energy storage apparatus 304. Subsequently, the process turns to steps S4 and S4'.

Step S4 and S4': Determine whether the internal temperature of the first energy storage apparatus 302 and the internal temperature of the second energy storage apparatus 304 exceed a preset temperature. Generally, an energy storage apparatus 300 detects an internal temperature of the energy storage apparatus 300 by using an NTC thermistor. When the temperature is higher, the resistance of the NTC thermistor is smaller. When the temperature is lower, the resistance of the NTC thermistor is higher. In this embodiment, it is detected whether the resistance of the NTC thermistor exceeds a preset value to determine whether an energy storage apparatus 300 is connected to a charging interface. When it is detected that the resistance of the NTC thermistor is excessively large, it indicates that an energy storage apparatus 300 is not connected to the charging interface. It is determined whether the resistance of the NTC thermistor is less than 300 k to determine whether the resistance of the NTC thermistor is excessively large. If the determining result is that the resistance is excessively large, it indicates that an energy storage apparatus 300 is connected to the charging interface, and the process turns to step S8 or S8'. If the determining result is that the resistance is not excessively large, it indicates that an energy storage apparatus 300 is not connected to the charging interface, and the process turns to step S6 or S6'. T1 denotes the resistance of an NTC thermistor of the first energy storage apparatus 302, and T2 denotes the resistance of the NTC thermistor of the second energy storage apparatus 304.

Step S6 and S6': Stop supplying charging energy to the first charging interface 202 or the second charging interface 204, and turn off the first indicator lamp 242 or the second indicator lamp 244. Subsequently, the process returns to step S2 or S2'.

Step S8 and S8': Determine whether an output voltage of the first energy storage apparatus 302 and an output voltage of the second energy storage apparatus 304 are greater than a first preset voltage value. When the determining result is that the output voltages are greater than the first preset voltage value, the process turns to step S10 and step S10'. When the determining result is that the output voltages are less than or equal to the first preset voltage value, the process turns to step S6 and S6'. In a specific embodiment, a nominal voltage of an energy storage apparatus 300 is 21V, and the first preset voltage value is 13V and is approximately 62% of the nominal voltage. Further alternatively, the first preset voltage value is 13V±0.5V. U1 denotes the output voltage of the first energy storage apparatus 302, and U2 denotes the output voltage of the second energy storage apparatus 304.

Step S10 and S10': Determine whether the output voltage of the first energy storage apparatus 302 and the output voltage of the second energy storage apparatus 304 are less than a second preset voltage value. When the determining result is that the output voltages are less than the second preset voltage value, the process turns to step S12. When the determining result is that the output voltages are greater than or equal to the second preset voltage value, the process turns to step S6 and S6'. In a specific embodiment, the nominal voltage of the energy storage apparatus 300 is 21V, and the second preset voltage value is 21V and is the same as the nominal voltage.

Step S12: Detect the signal sent by the adjustable setting apparatus 212 sent. When the signal sent by the adjustable setting apparatus 212 is B, the process turns to step S14, that is, the charging circuit 206 enters the second charging mode. When the signal sent by the adjustable setting apparatus 212 is A, the process turns to step S16, that is, the charging circuit 206 enters the first charging mode. Specifically, when the signal sent by the adjustable setting apparatus 212 is B, the value of statemachine is set to 1. When the signal sent by the adjustable setting apparatus 212 is A, the value of statemachine is set to 0. In Step S12, it is determined whether statemachine is 1 to determine whether the signal sent by the adjustable setting apparatus 212 is A or B.

Step S14 further includes the following steps.

Step S140: Determine whether the output voltage of the first energy storage apparatus 302 is greater than the output voltage of the second energy storage apparatus 304. When the determining result is that the output voltage of the first energy storage apparatus 302 is greater than the output voltage of the second energy storage apparatus 304, the process turns to step S142. When the determining result is that the output voltage of the first energy storage apparatus 302 is less than or equal to the output voltage of the second energy storage apparatus 304, the process turns to step S142'.

Step S142: Stop supplying charging energy to the second charging interface 204, and turn off the second indicator lamp 244. Charging energy is supplied to the first charging interface 202 in a constant current manner, and the first indicator lamp 242 is controlled to display green and blink. Subsequently, the process turns to step S144.

Step S144: Determine whether the output voltage of the first energy storage apparatus 302 is greater than or equal to a third preset voltage value. If the nominal voltage of the energy storage apparatus 300 is 21V, the third preset voltage is 20V. When the determining result is that the output voltage of the first energy storage apparatus 302 is greater than or equal to the third preset voltage, the process turns to step S146. When the determining result is that the output voltage of the first energy storage apparatus 302 is less than the third preset voltage, the process turns to step S148.

Step S146: Supply charging energy to the first charging interface 202 in a constant voltage manner, where the value of the constant voltage is 20.75V±0.125V. Subsequently, the process turns to step S150.

Step S148: Determine whether statemachine is 1, that is, determine whether the signal sent by the adjustable setting apparatus 212 is B. If the determining result is that statemachine is 1, the process turns to step S142. If the determining result is that statemachine is not 1, the process turns to step S16.

Step S150: Determine whether the output voltage of the first energy storage apparatus 302 is less than or equal to a fourth preset voltage. If the nominal voltage of the energy storage apparatus 300 is 21V, the fourth preset voltage is preferably 21V. When the determining result is that the output voltage of the first energy storage apparatus 302 is less than or equal to the fourth preset voltage, the process turns to step S152. When the determining result is that the output voltage of the first energy storage apparatus 302 is greater than the fourth preset voltage, the process turns to step S156.

Step S152: Determine whether a charging current is greater than or equal to a charging cut-off current. If the determining result is that the charging current is greater than or equal to the charging cut-off current, the process turns to step S154. If the determining result is that the charging current is less than the charging cut-off current, the process turns to step S156. I1 denotes a charging current supplied to the first charging interface 202.

Step S154: Determine whether a charging time is greater than or equal to a preset charging time. Alternatively, the preset charging time is 11 h±1 h. When the determining result is that the charging time is less than the preset charging time, the process turns to step S158. When the determining result is that the charging time is greater than or equal to the preset charging time, the process turns to step S156. The time 1 denotes duration of supplying the charging energy to the first charging interface 202.

Step S156: Stop supplying charging energy to the first charging interface 202, and control the first indicator lamp 242 to display green and stay on. Subsequently, the process turns to step S157.

Step S157: Set the value of statemachine to 0, and at the same time switch the third indicator lamp 246 that indicates the state of the adjustable setting apparatus 212 to an off state. Subsequently, the process returns to step S0.

Step S158: Determine whether statemachine is 1, that is, determine whether the signal sent by the adjustable setting apparatus 212 is B. If the determining result is that the signal is B, the process turns to step S150. If the determining result is that the signal is not B, the process turns to step S16.

Step S142': Stop supplying charging energy to the first charging interface 202, and turn off the first indicator lamp 242. Charging energy is supplied to the second charging interface 204 in a constant current manner, and the second indicator lamp 244 is controlled to display green and blink. Subsequently, the process turns to step S144'.

Step S144': Determine whether the output voltage of the second energy storage apparatus 304 is greater than or equal to the third preset voltage. If the nominal voltage of the energy storage apparatus 300 is 21V, the third preset voltage is 20V. When the determining result is that the output voltage is greater than or equal to the third preset voltage, the process turns to step S146'. When the determining result is that the output voltage is less than the third preset voltage, the process turns to step S148'.

Step S146': Supply charging energy to the second charging interface 204 in a constant voltage manner, where the value of the constant voltage is 20.75V±0.125V. Subsequently, the process turns to step S150'.

Step S148': Determine whether statemachine is 1, that is, determine whether the signal sent by the adjustable setting apparatus 212 is B. If the determining result is that statemachine is 1, the process turns to step S142'. If the determining result is that statemachine is not 1, the process turns to step S16.

Step S150': Determine whether the output voltage of the second energy storage apparatus 304 is less than or equal to the fourth preset voltage. If the nominal voltage of the energy storage apparatus 300 is 21V, the fourth preset voltage is preferably 21V. When the determining result is that the output voltage is less than or equal to the fourth preset voltage, the process turns to step S152'. When the determining result is that the output voltage is greater than the fourth preset voltage, the process turns to step S156'.

Step S152': Determine whether a charging current is greater than or equal to a charging cut-off current. If the determining result is that the charging current is greater than or equal to the charging cut-off current, the process turns to step S154'. If the determining result is that the charging current is less than the charging cut-off current, the process turns to step S156'.

Step S154': Determine whether a charging time is greater than or equal to a preset charging time. Alternatively, the preset charging time is 11 h±1 h. When the determining result is that the charging time is less than the preset charging time, the process turns to step S158'. When the determining result is that the charging time is greater than or equal to the preset charging time, the process turns to step S156'.

Step S156': Stop supplying charging energy to the second charging interface 204, and control the second indicator lamp 244 to display green and stay on.

Step S158': Determine whether statemachine is 1, that is, determine whether the signal sent by the adjustable setting apparatus 212 is B. If the determining result is that statemachine is 1, the process turns to step S150'. If the determining result is that statemachine is not 1, the process turns to step S16.

Step S16 further includes the following steps.

Step S160: Supply charging energy to both the first charging interface 202 and the second charging interface 204, where the first charging interface 202 and the second charging interface 204 are connected in parallel. The first indicator lamp 242 and the second indicator lamp 244 are both controlled to display green and blink, representing that both the first energy storage apparatus 302 and the second energy storage apparatus 304 are being charged. The process turns to step S162.

Step S162: Determine whether the output voltage of the first energy storage apparatus 302 is less than a fifth preset voltage. If the nominal voltage of the energy storage apparatus 300 is 21V, the fifth preset voltage is preferably 20.75V. When the determining result is that the output voltage is less than the fifth preset voltage, the process turns to step S164. When the determining result is that the output voltage is greater than or equal to the fifth preset voltage, the process turns to step S174.

Step S164: Determine whether the output voltage of the second energy storage apparatus 304 is less than the fifth preset voltage. If the nominal voltage of the energy storage apparatus 300 is 21V, the fifth preset voltage is preferably 20.75V. When the determining result is that the output voltage is less than the fifth preset voltage, the process turns to step S166. When the determining result is that the output voltage is greater than or equal to the fifth preset voltage, the process turns to step S168.

Step S166: Determine whether statemachine is 0, that is, determine whether the signal sent by the adjustable setting apparatus 212 is A. If the determining result is that statemachine is 0, the process turns to step S160. If the determining result is that statemachine is not 0, the process turns to step S14.

Step S168: Stop supplying charging energy to the second charging interface 204, and control the second indicator lamp 244 to display green and stay on, representing that the second energy storage apparatus 304 is fully charged. Subsequently, the process turns to step S170.

Step S170: Continue to supply charging energy to the first charging interface 202. Subsequently, the process turns to step S172.

Step S172: Determine whether the first energy storage apparatus 302 is fully charged. When the determining result is that the first energy storage apparatus 302 is fully charged, the process returns to step S0. When the determining result is that the first energy storage apparatus 302 is not fully charged, the process returns to step S170.

Step S174: Stop supplying charging energy to the first charging interface 202, and control the first indicator lamp 242 to display green and stay on, representing that the first energy storage apparatus 302 is fully charged. Subsequently, the process turns to step S176.

Step S176: Continue to supply charging energy to the second charging interface 204. Subsequently, the process turns to step S178.

Step S178: Determine whether the second energy storage apparatus 304 is fully charged. When the determining result is that the second energy storage apparatus 304 is fully charged, the process returns to step S0. When the determining result is that the second energy storage apparatus 304 is not fully charged, the process returns to step S176.

The foregoing embodiments are all described by using an example in which the charging apparatus includes two charging interfaces. It may be understood that the charging apparatus according to the concept of the present embodiments may further include three, four or more charging interfaces to charge more energy storage apparatuses. In this case, the circuit module diagram, the structural block diagram, and the working flowchart of the charging apparatus are correspondingly changed.

The foregoing definitions of the elements are not limited to various specific structures or shapes mentioned in the implementations. A person of ordinary skill in the art may make simple and well-known replacements.

A person skilled in the art may easily understand that the present embodiments may further have other implementations. However, all implementations that use technical essence that is the same as or similar to that of the present embodiments or all variations and replacements made based on the present embodiments fall within the protection scope of the present embodiments of the present embodiments.

What is claimed is:

1. A charging apparatus, wherein the charging apparatus comprises:
    a first charging interface, detachably connected to a first energy storage apparatus;
    a second charging interface, detachably connected to a second energy storage apparatus, wherein
    at the same time when the first energy storage apparatus is connected to the first charging interface, the second charging interface may be connected to the second energy storage apparatus;
    a power supply conversion circuit, converting external power supply into charging energy;
    a charging circuit, outputting charging energy output by the power supply conversion circuit to the first charging interface and the second charging interface, wherein the charging circuit comprises a first charging mode and a second charging mode, in the first charging mode, the charging circuit outputs charging energy to both the first charging interface and the second charging interface, and in the second charging mode, the charging circuit outputs charging energy to the first charging interface or the second charging interface selectively;
    a control circuit, selectively sending a first signal or a second signal to the charging circuit, wherein when the control circuit sends the first signal, the charging circuit is in the first charging mode; and when the control circuit sends the second signal, the charging circuit is in the second charging mode;
    wherein the control circuit further comprises a priority setting module, wherein in the second charging mode, the charging circuit sequentially outputs charging energy to the first charging interface and the second charging interface, and the charging circuit sets, according to a signal sent by the priority setting module, an order of outputting charging energy to the first charging interface and the second charging interface; and
    wherein the priority setting module detects a second characteristic parameter of an energy storage apparatus connected to a charging interface; determines, according to the second characteristic parameter, a time required to fully charge the energy storage apparatus; and sends a signal to the charging circuit according to the determining result.

2. The charging apparatus according to claim 1, wherein the charging apparatus further comprises an adjustable setting apparatus operated by a user, the adjustable setting apparatus is operable to send different signals to the control circuit, and the control circuit sends the first signal or the second signal to the charging circuit according to a signal sent by the adjustable setting apparatus.

3. The charging apparatus according to claim 1, wherein the control circuit detects a first characteristic parameter of an energy storage apparatus connected to a charging interface, the control circuit sends the first signal or the second signal to the charging circuit according to the detection result, and the charging circuit enters the first charging mode or the second charging mode according to a signal sent by the control circuit, and charges the energy storage apparatus connected to the charging interface in a chosen charging mode until the energy storage apparatus is fully charged.

4. The charging apparatus according to claim 1, wherein the charging circuit first outputs, according to the signal sent by the priority setting module, charging energy to a charging interface connected to an energy storage apparatus that requires a short time to be fully charged, and then outputs, after the energy storage apparatus is fully charged, charging energy to a charging interface connected to an energy storage apparatus that requires a long time to be fully charged.

5. The charging apparatus according to claim 4, wherein the second characteristic parameter is an output voltage of an energy storage apparatus, and when the energy storage apparatus has a higher voltage, the determining result of the priority setting module is that the energy storage apparatus needs a shorter charging time.

6. The charging apparatus according to claim 1, wherein in the second charging mode, the charging circuit first outputs charging energy to the first charging interface, and after the control circuit detects that the first energy storage apparatus is fully charged, the charging circuit is controlled to output charging energy to the second charging interface.

7. The charging apparatus according to claim 1, wherein in the first charging mode, the first charging interface is connected to the second charging interface in parallel.

8. The charging apparatus according to claim 1, wherein the charging apparatus comprises an adapter housing and a charging base housing, the power supply conversion circuit is disposed in the adapter housing, the charging circuit and the control circuit are at least partially disposed in the charging base housing, the first charging interface and the second charging interface are disposed on the charging base housing, and the adapter housing and the charging base housing are separate from each other and are connected through an electrical cable.

9. A charging system, comprising a charging apparatus and an energy storage apparatus, wherein
the energy storage apparatus at least comprises a first energy storage apparatus and a second energy storage apparatus detachably connected to the charging apparatus; and
the charging apparatus comprises:
a first charging interface, detachably connected to the first energy storage apparatus;
a second charging interface, detachably connected to the second energy storage apparatus, wherein at the same time when the first energy storage apparatus is connected to the first charging interface, the second charging interface may be connected to the second energy storage apparatus;
a power supply conversion circuit, converting external power supply into charging energy;
a charging circuit, outputting charging energy output by the power supply conversion circuit to the first charging interface and the second charging interface, wherein the charging circuit comprises a first charging mode and a second charging mode, in the first charging mode, the charging circuit outputs charging energy to both the first charging interface and the second charging interface, and in the second charging mode, the charging circuit outputs charging energy to the first charging interface or the second charging interface (204) selectively;
a control circuit, selectively sending a first signal or a second signal to the charging circuit, wherein when the control circuit sends the first signal, the charging circuit is in the first charging mode; and when the control circuit sends the second signal, the charging circuit is in the second charging mode;
wherein the control circuit further comprises a priority setting module, wherein in the second charging mode, the charging circuit sequentially outputs charging energy to the first charging interface and the second charging interface, and the charging circuit sets, according to a signal sent by the priority setting module, an order of outputting charging energy to the first charging interface and the second charging interface; and
wherein the priority setting module detects a second characteristic parameter of an energy storage apparatus connected to a charging interface; determines, according to the second characteristic parameter, a time required to fully charge the energy storage apparatus; and sends a signal to the charging circuit according to the determining result.

10. The charging system according to 9, wherein the charging apparatus further comprises an adjustable setting apparatus operated by a user, the adjustable setting apparatus is operable to send different signals to the control circuit, and the control circuit sends the first signal or the second signal to the charging circuit according to a signal sent by the adjustable setting apparatus.

11. A charging method, capable of charging at least two energy storage apparatuses, wherein the charging method comprises the following steps:
confirming that a first energy storage apparatus is connected to a charging apparatus;
confirming that a second energy storage apparatus is connected to the charging apparatus;
entering a first charging mode or a second charging mode, wherein in the first charging mode, both the first energy storage apparatus and the second energy storage apparatus are charged; and in the second charging mode, the first energy storage apparatus or the second energy storage apparatus is selectively charged;
wherein after the second charging mode is entered, a charging circuit sequentially outputs charging energy to a first charging interface and a second charging interface, and the charging method further comprises detecting a second characteristic parameter of the first energy storage apparatus and the second energy storage apparatus, and setting, according to the detection result, an order of outputting charging energy to the first energy storage apparatus and the second energy storage apparatus; and determining, according to the second characteristic parameter, a time required to fully charge the energy storage apparatus, and sends a signal to the charging circuit according to the determining result.

12. The charging method according to claim 11, wherein the charging method further comprises the following step before the step of entering a first charging mode or a second charging mode:

detecting a signal sent by an adjustable setting apparatus operated by a user, and choosing, according to the signal of the adjustable setting apparatus, to enter the first charging mode or the second charging mode.

* * * * *